(12) United States Patent
Chen et al.

(10) Patent No.: US 9,079,479 B2
(45) Date of Patent: Jul. 14, 2015

(54) AUTOMATED SUNSHADE

(71) Applicants: Liang Chen, San Jose, CA (US);
Yongchang Wang, San Jose, CA (US)

(72) Inventors: Liang Chen, San Jose, CA (US);
Yongchang Wang, San Jose, CA (US)

(*) Notice: Subject to any disclaimer, the term of this patent is extended or adjusted under 35 U.S.C. 154(b) by 50 days.

(21) Appl. No.: 14/059,130

(22) Filed: Oct. 21, 2013

(65) Prior Publication Data

US 2015/0107783 A1    Apr. 23, 2015

(51) Int. Cl.
B60J 1/20      (2006.01)
E06B 9/72      (2006.01)
E06B 9/68      (2006.01)

(52) U.S. Cl.
CPC .............. *B60J 1/2016* (2013.01); *B60J 1/2019* (2013.01); *B60J 1/2025* (2013.01); *B60J 1/2077* (2013.01); *E06B 9/72* (2013.01); *E06B 2009/6818* (2013.01)

(58) Field of Classification Search
CPC ....... B60J 1/2013; B60J 1/2016; B60J 1/2025
USPC .................... 296/97.4, 97.1, 97.8; 160/DIG. 3
See application file for complete search history.

(56) References Cited

U.S. PATENT DOCUMENTS

| | | | | | |
|---|---|---|---|---|---|
| 4,784,215 | A | * | 11/1988 | Sing | 165/41 |
| 5,076,633 | A | * | 12/1991 | Hsu et al. | 296/97.4 |
| 5,791,721 | A | * | 8/1998 | Lin | 296/97.8 |
| 6,189,948 | B1 | * | 2/2001 | Lin | 296/97.4 |
| 7,461,887 | B1 | * | 12/2008 | Federle et al. | 296/97.4 |
| 7,718,923 | B1 | * | 5/2010 | Hansen et al. | 219/203 |
| 2003/0141025 | A1 | * | 7/2003 | Schlecht et al. | 160/370.22 |
| 2004/0065101 | A1 | * | 4/2004 | Krupp et al. | 62/244 |
| 2004/0201244 | A1 | * | 10/2004 | Neuer et al. | 296/136.1 |
| 2005/0061454 | A1 | * | 3/2005 | Chen | 160/370.22 |
| 2007/0222252 | A1 | * | 9/2007 | Suzuki et al. | 296/97.8 |
| 2008/0006373 | A1 | * | 1/2008 | Lin | 160/321 |
| 2010/0094501 | A1 | * | 4/2010 | Kwok | 701/36 |
| 2013/0206344 | A1 | * | 8/2013 | Chen | 160/370.23 |
| 2014/0224434 | A1 | * | 8/2014 | Gross et al. | 160/127 |
| 2014/0345807 | A1 | * | 11/2014 | Derk | 160/7 |
| 2015/0061324 | A1 | * | 3/2015 | Sinclair | 296/191 |

* cited by examiner

Primary Examiner — Jason S Morrow
(74) Attorney, Agent, or Firm — Douglas L. Weller

(57) ABSTRACT

An automated vehicle sunshade system includes a roller on which is mounted shield material. A motor opens the shield material so as to block sunlight entering a vehicle through a window.

22 Claims, 11 Drawing Sheets

AUTOMATED SUNSHADE

BACKGROUND

When the weather is hot, a sunshade is often placed in the windshield of a vehicle to block out sunlight. The sunshade can reduce interior temperature of a vehicle by blocking out or reflecting rays from the sun. This can increase the comfort of the driver by reducing the overall temperature of a car parked in the sun. It can also prevent sunlight from hitting the steering wheel of a parked car, which can result in make operation of the vehicle inconvenient.

In addition to improving driver comfort, a sunshade also protects sound equipment and other electronics from exposure to excessive heat. The excessive heat resulting from a car parked in the sun can result in damage to sensitive LCD screens, electronics, audio-video media and so on.

Excessive heat and exposure to ultraviolet (UV) radiation can also lead to deterioration of car dashboards and upholstery. Over time these car interior components can become faded or cracked by the sun.

DETAILED DESCRIPTION

Figure 1:
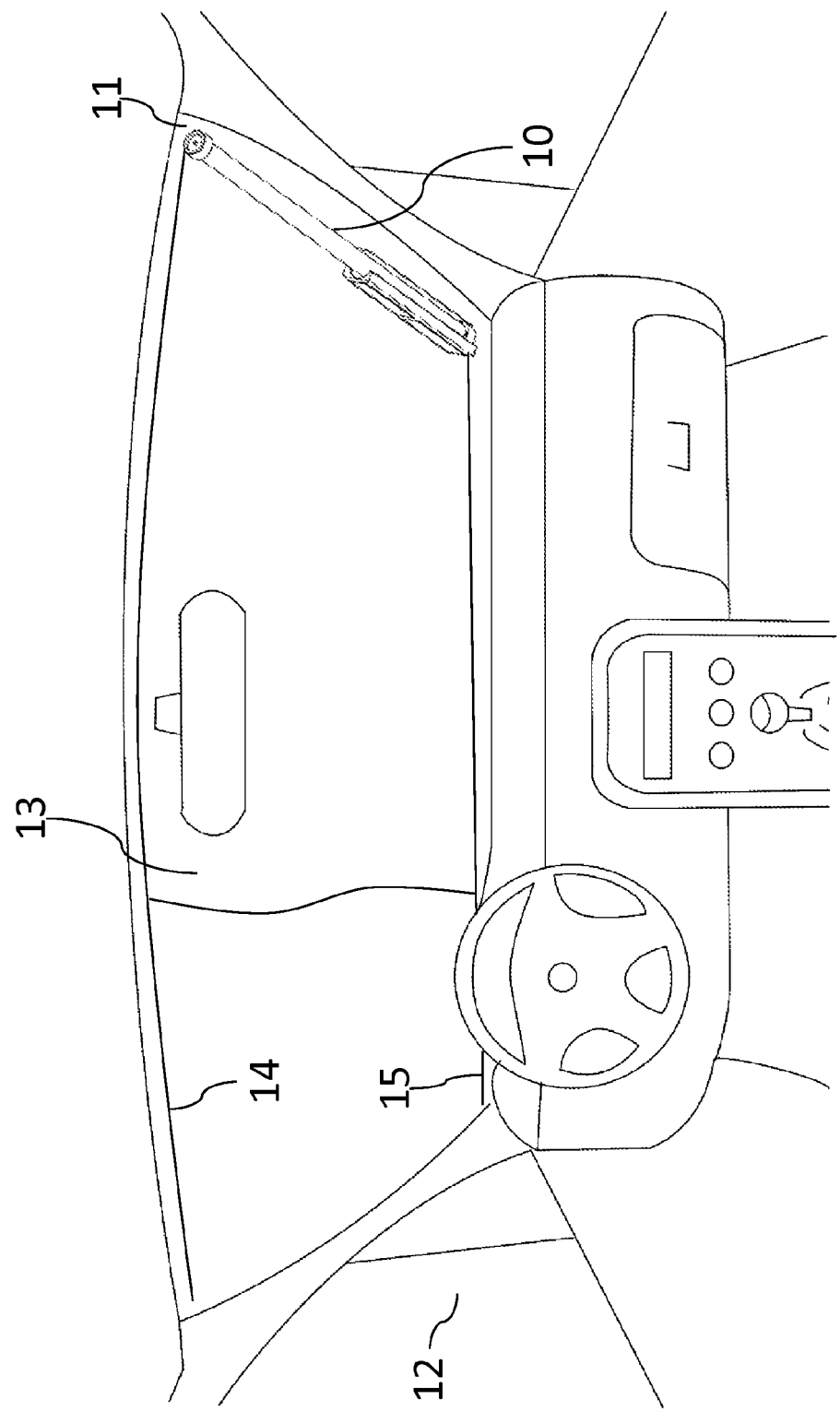
FIG. 1 shows an automated sunshade mounted on a vehicle windshield in accordance with an embodiment.

FIG. 1 shows an automated sunshade system 10 mounted on a windshield 11 of a vehicle 12. Sunshade system 10 detects strength of sunlight and rolls out shield material 13 along an upper track 14 and a lower track 15 at a predetermined strength of sunlight. For example, shield material 13 is composed of ultraviolet (UV) block nylon or some other material that blocks and/or reflects light.

Sunshade system 10 retracts shield material 13 when sunlight strength is below a predetermined strength. Sunshade system 10 also detects vehicle motion and vibration to trigger retraction and prevent rolling out of shield material 13 when vehicle 12 is in use or about to be in use.

Upper track 14 and lower track 15 are constructed from flexible piping to allow compatibility with a wide range of vehicle models. Instead of, or in addition to, tracks, a fixed pulley can be located on an opposite side of windshield 11 as automated sunshade system 10 and used to guide shield material 13 across windshield 11. A static electricity film can also be used to guide shield material 13 across windshield 11.

Sunshade system 10 can be attached to windshield 11 or another part of vehicle 12 through the use of an attaching base employing, for example, strips of a hook and loop fastener (such as a Velcro hook and loop fastener), suction cups or a static electricity film.

Figure 2:
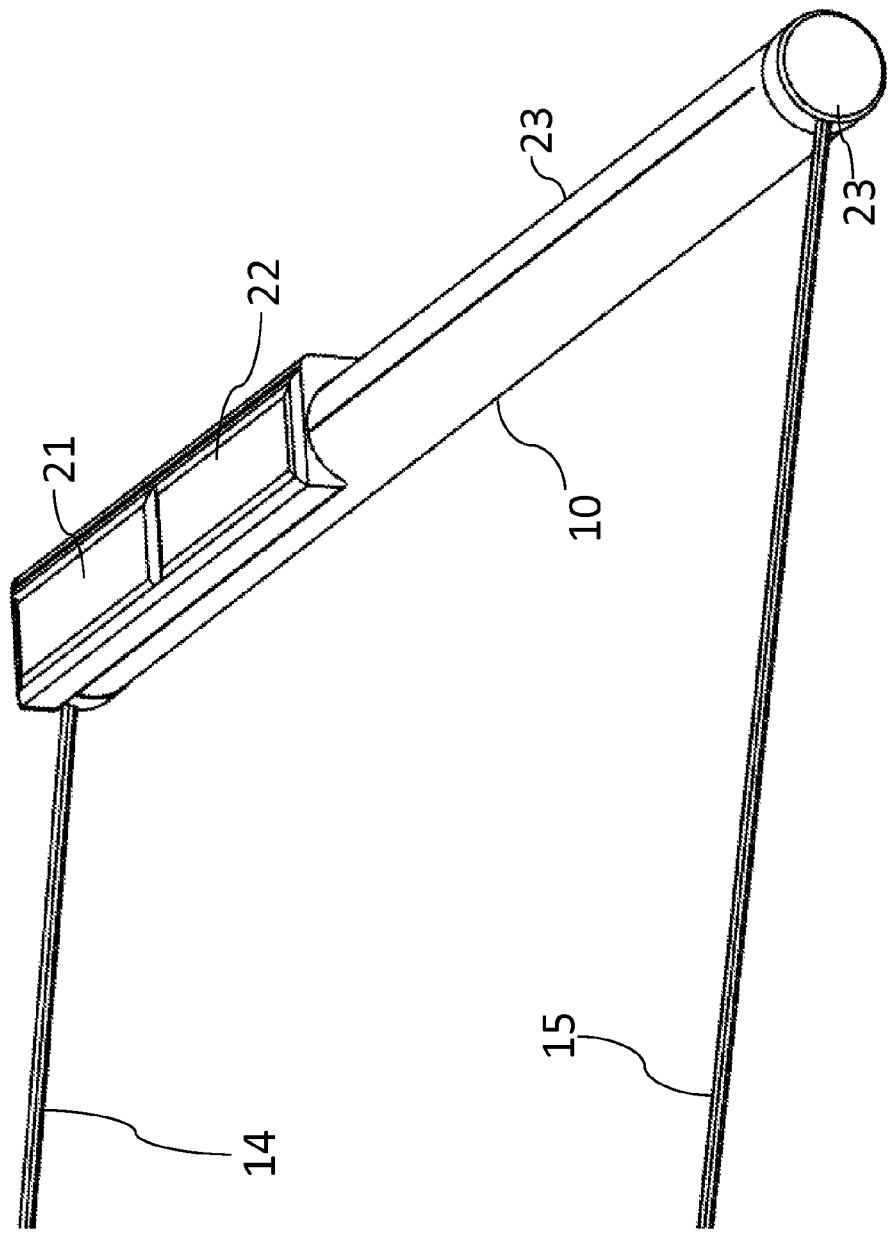
FIG. 2 shows additional detail of the automated sunshade shown in FIG. 1, including tracks in accordance with an embodiment.

FIG. 2 shows that automated sunshade system 10 includes a solar panel 21 and a solar panel 22. For example, solar panel 21 and solar panel 22 provide power to open shield material 13. When light captured by solar panel 21 and solar panel 22 is below a predetermined intensity threshold, a spring within automated sunshade system 10 automatically closes solar material 13. Because of this, automated sunshade can be implemented without any battery storage. Alternative to a spring, enough residual energy can be stored in a rechargeable battery within sunshade system 10 to allow solar material 13 to be closed even when light captured by solar panel 21 and solar panel 22 is below a predetermined intensity threshold.

Figure 3:
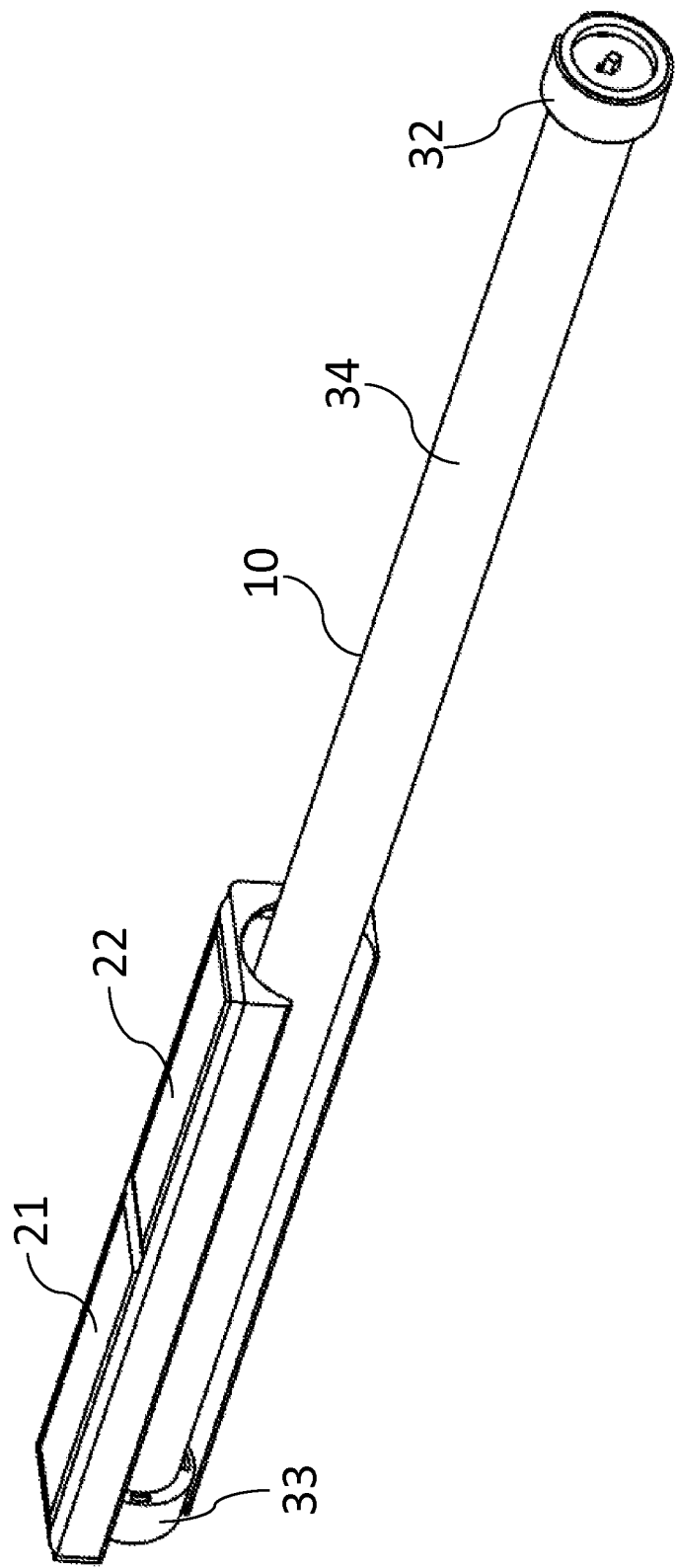
FIG. 3 shows additional detail of the automated sunshade shown in FIG. 1, not including tracks in accordance with an embodiment.

FIG. 3 shows automated sunshade system 10 with a cover 23 (shown in FIG. 2) removed to expose a tube base 34 on top of which material 13 is rolled up between a roller guide 32 and a roller guide 33.

Figure 4:
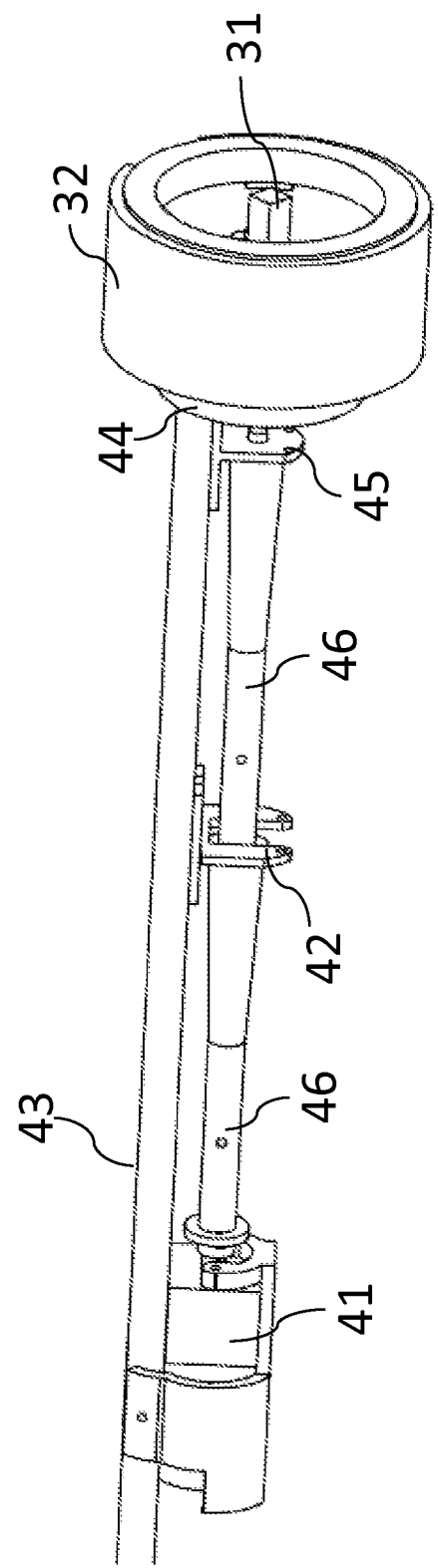
FIG. 4 shows implementation details of the automated sunshade shown in FIG. 1 in accordance with an embodiment.

FIG. 4 shows a part of automated sunshade system 10 with tube base 34 removed. When assembled, tube base 34 rests on base 44 and turns with a rolling axel 31. Rolling axel 31 is supported by a support 42 and a support 45. Rotation of rolling axel 31 is controlled by a motor within motor and circuitry housing 41. The motor is powered by electricity generated by solar panel 21 and solar panel 22 shown in FIG. 2. The circuitry causes the motor to open shield material 13 when light captured by solar panel 21 and solar panel 22 is above a first predetermined intensity threshold and causes shield material 13 to retract when light captured by solar panel 21 and solar panel 22 is below a first predetermined intensity threshold. The first and second predetermined thresholds may have the same or different values, provided the value for the first predetermined intensity threshold is equal to or greater than the first predetermined intensity threshold different. Also, solar panel 21 and solar panel 22 are exemplary. In various embodiments, solar panel 21 and solar panel 22 may be replaced by a single solar panel or more than two solar panels.

The circuitry includes a motion detector to determine whether vehicle 12 is in motion. The motion detected is caused, for example, by vibrations from an engine within vehicle 12, or by movement of vehicle 12 along a road. For example, the circuitry also includes a timer so that vehicle 12 needs to be still for a predetermined amount of time (e.g., five minutes), before automated sunshade system 10 will open shield material 13. When shield material 13 is open and the circuitry detects motion of vehicle 12, for example by starting the engine, automated sunshade system 10 immediately retracts shield material 13.

Figure 5:
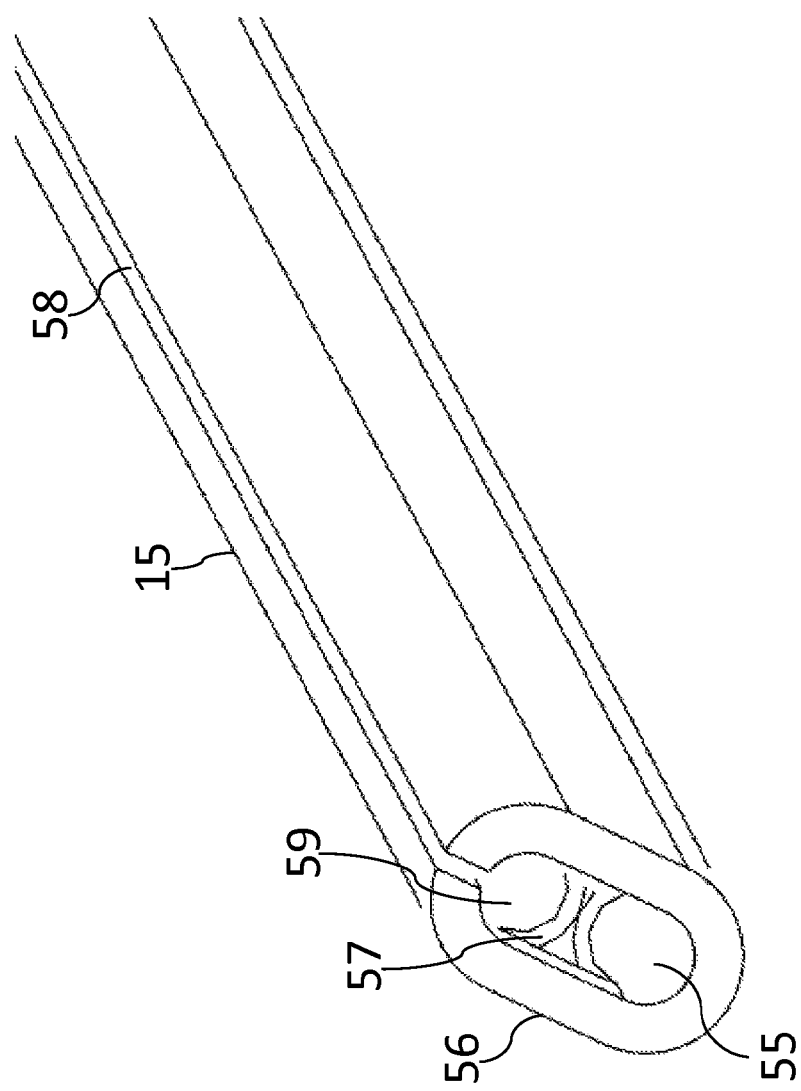
FIG. 5 shows implementation details of a track for the automated sunshade shown in FIG. 1 in accordance with an embodiment.

FIG. 5 shows additional detail of a portion of track 15. Side 56 of track 15 is the side of track 15 attached to windshield 51. A cable is attached to a one of rollers 46 (shown in FIG. 4) powered by the motor within housing 41. For example, the cable is a nylon cord or cord made from another strong flexible material. The cable extends through pipe opening 55 and then, via a pulley or low friction guide, is fed back through opening 58 and attaches to shield material 13. Shield material 13 extends through slot 56 and is held there by a flared end within slot 56. As the motor winds up the cable, shield material 13 is pulled along slot 56 into an open position. When shield material is retracted, the cable is accordingly unwound. For example, instead of a cable, a chain may be used.

Figure 6:
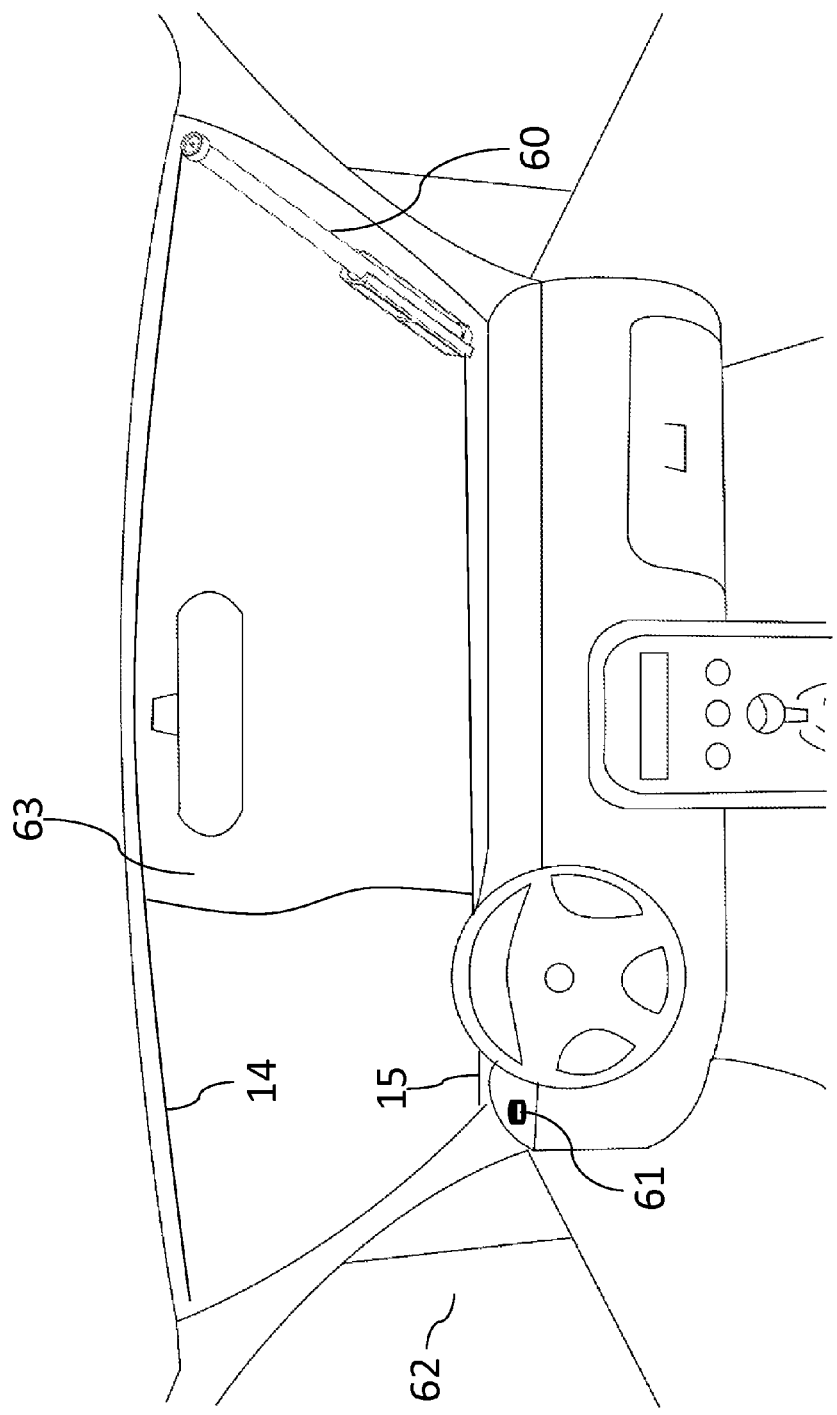
FIG. 6 shows an automated sunshade mounted on a vehicle windshield with an installed user control in accordance with another embodiment.

FIG. 6 shows an automated sunshade system 60 mounted on a windshield 61 of a vehicle 62. Automated sunshade system 60 rolls out and retracts shield material 63 along an upper track 64 and a lower track 65. Instead of, or in addition to, opening and retracting shield material 63 based on intensity of sunlight, a switch 66, conveniently located to a user of vehicle 62, is used to instruct automated sunshade system 60 when to open and retract shield material 63. Sunshade 60 is powered, for example, by solar power or by battery power. The battery power can be supplied by the main battery for vehicle 62, or by smaller batteries housed within automated sunshade system 60.

Figure 7:
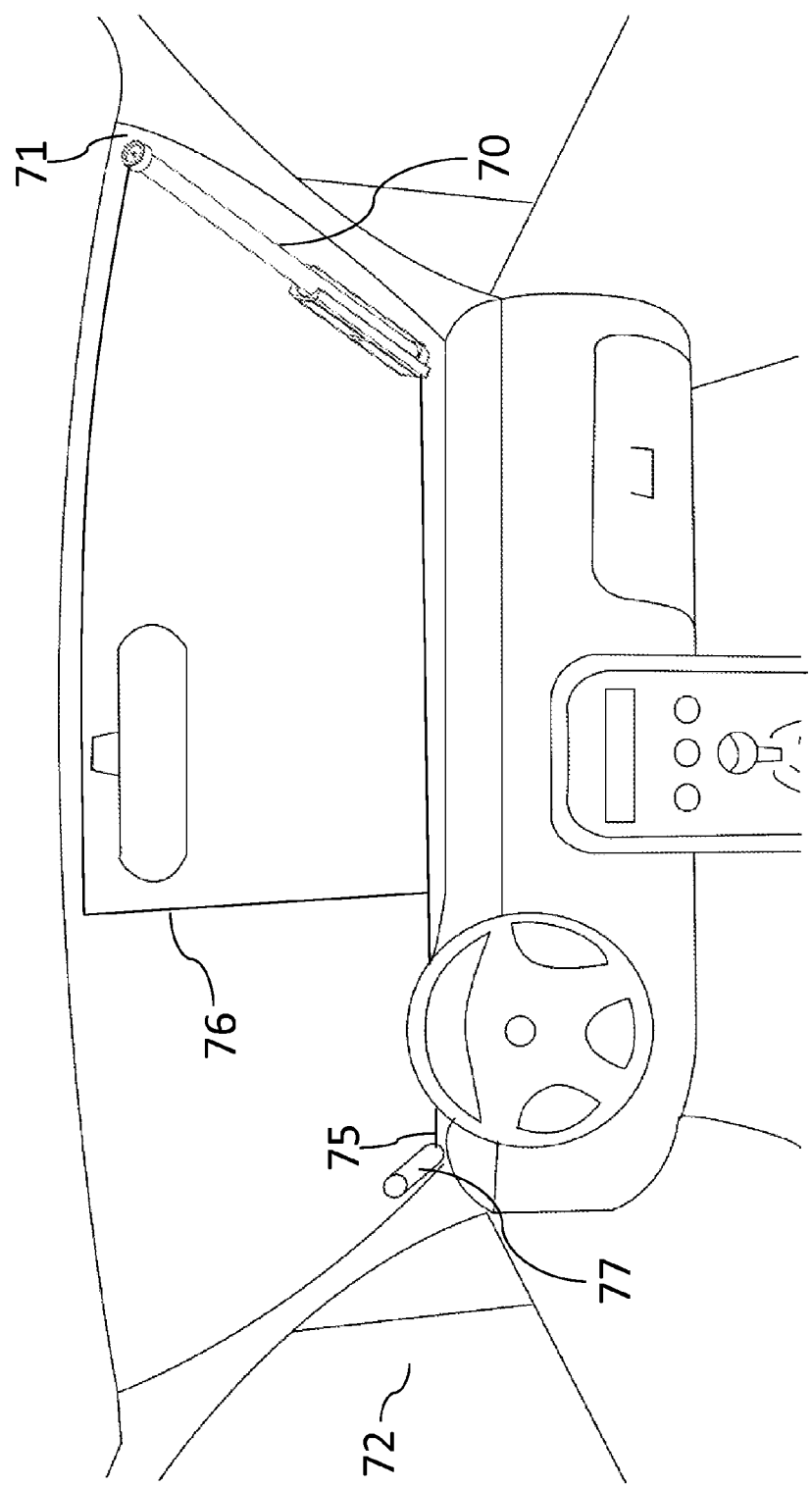
FIG. 7 shows an automated sunshade mounted on a vehicle windshield with a separately located motor in accordance with another embodiment.

FIG. 7 shows an automated sunshade system 70 mounted on a windshield 71 of a vehicle 72. A motor 77 for automated sunshade system 70 pulls a cable 75 to pull open shield material 73. A spring or motor within automated sunshade system 70 retracts shield material 73. A rod 76 on the leading edge of shield material 73 keeps the shape of shield material 73 as shield material 73 is pulled open.

Figure 8:
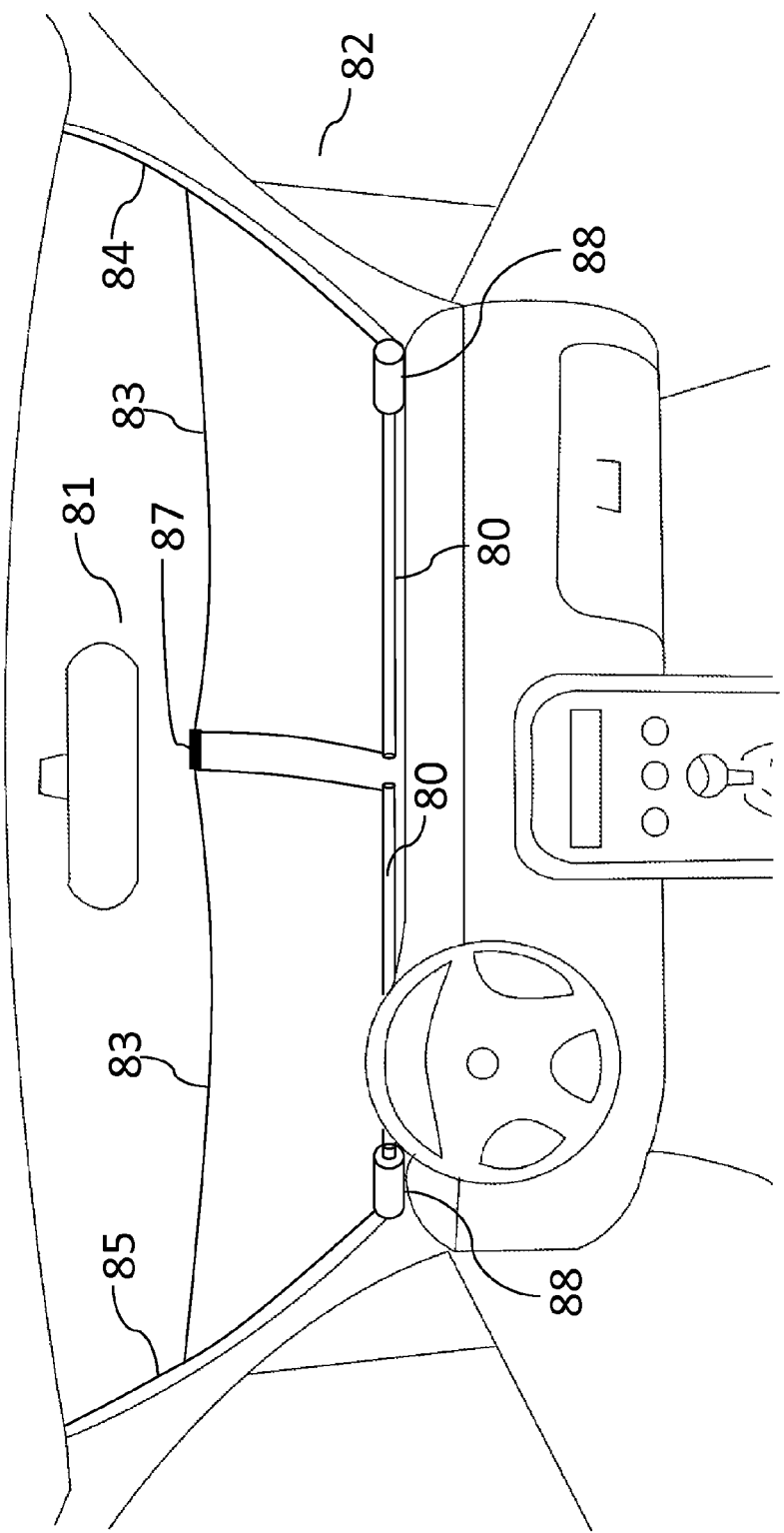
FIG. 8 shows an automated sunshade mounted on a vehicle windshield in accordance with another embodiment.

FIG. 8 shows an automated sunshade system mounted on a windshield 81 of a vehicle 82. The automated sunshade consists of two sections. An automated sunshade system section 80, including a motor and power unit 88, rolls out and retracts shield material 83 along a side track 85. An automated sunshade system section 800, including a motor and power unit 880, rolls out and retracts shield material 830 along a side track 84. A connector 87 holds shield material 83 and shield material 830 together and keeps shield material 83 and shield material 830 in synchronization when automated sunshade system section 80 and automated sunshade system section 800 respectively open and retract shield material 83 and shield material 830.

Figure 9:
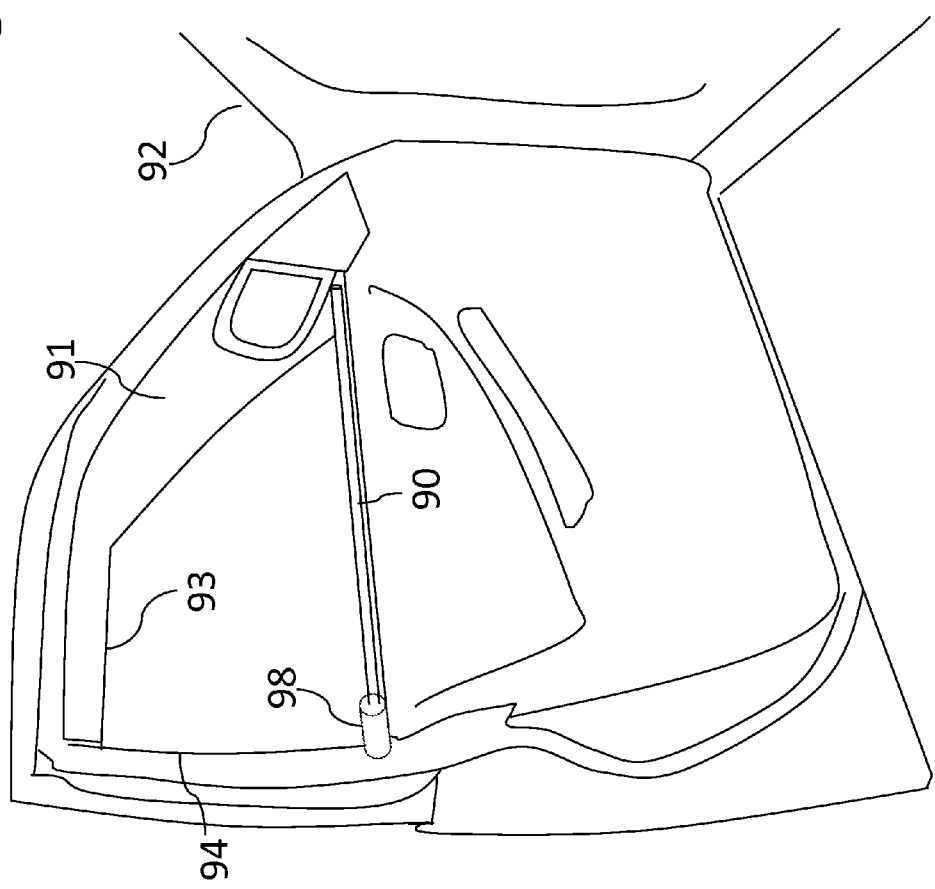
FIG. 9 shows an automated sunshade mounted on a vehicle side window in accordance with another embodiment.

In addition to being place on a windshield, the automated sunshade system can also be placed on rear windows and side windows of a vehicle. For example, FIG. 9 shows an automated sunshade system 90 mounted on a side window 91 of a vehicle 92. Automated sunshade 90 includes a motor and power unit 98 that rolls out and retracts shield material 93 along a side track 94.

Figure 10:
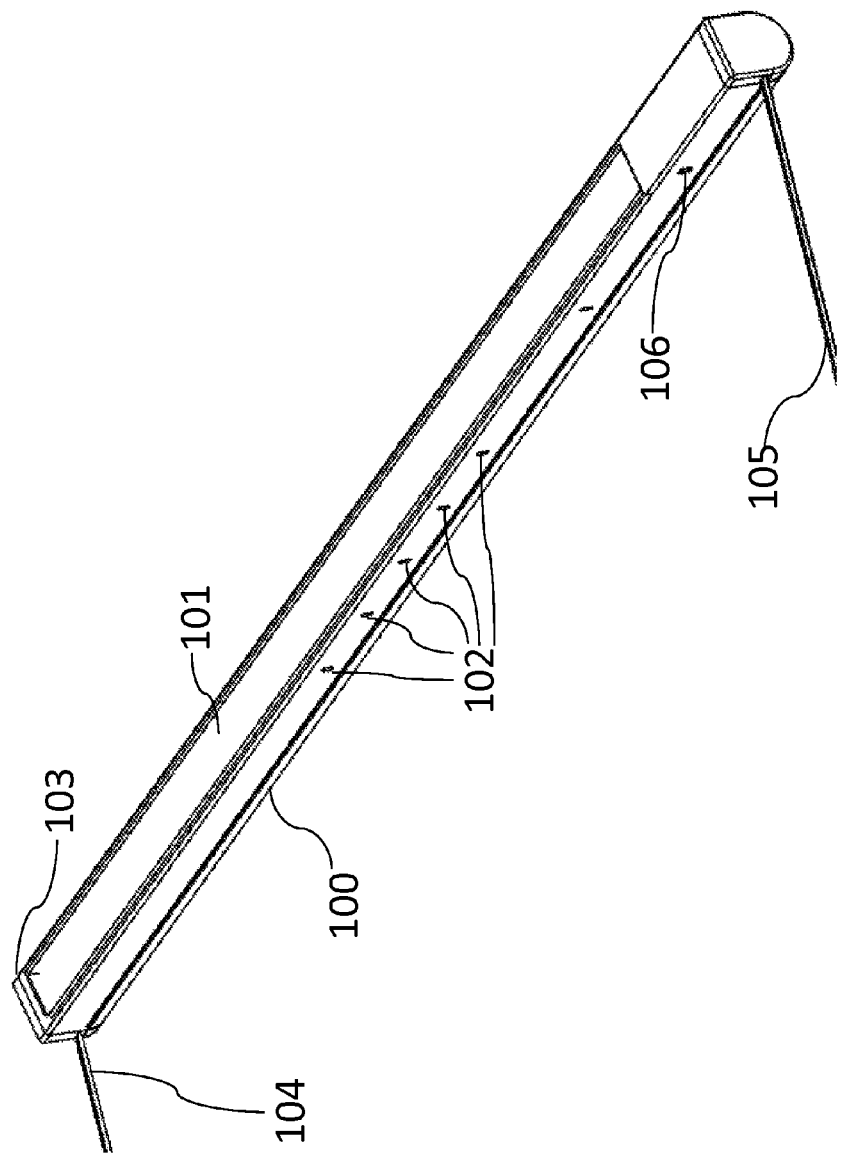
FIG. 10 shows detail of an automated sunshade in accordance with another embodiment.

FIG. 10 shows an automated sunshade 100 with a single long solar panel 101. Sunshade system 100 detects strength of sunlight and rolls out shield material, residing initially under a cover 103, along a track 104 and a track 105 at a predetermined strength of sunlight. Status lights 102 represent one or more pilot signal lights that indicate status such as motion status and relative sunlight strength. A power switch 106 is an on/off button. If sunshade system 100 is first turned off when the shield material is rolled out, sunshade system 100 rolls up the shield material into a closed position and then turns off status lights 102.

Figure 11:
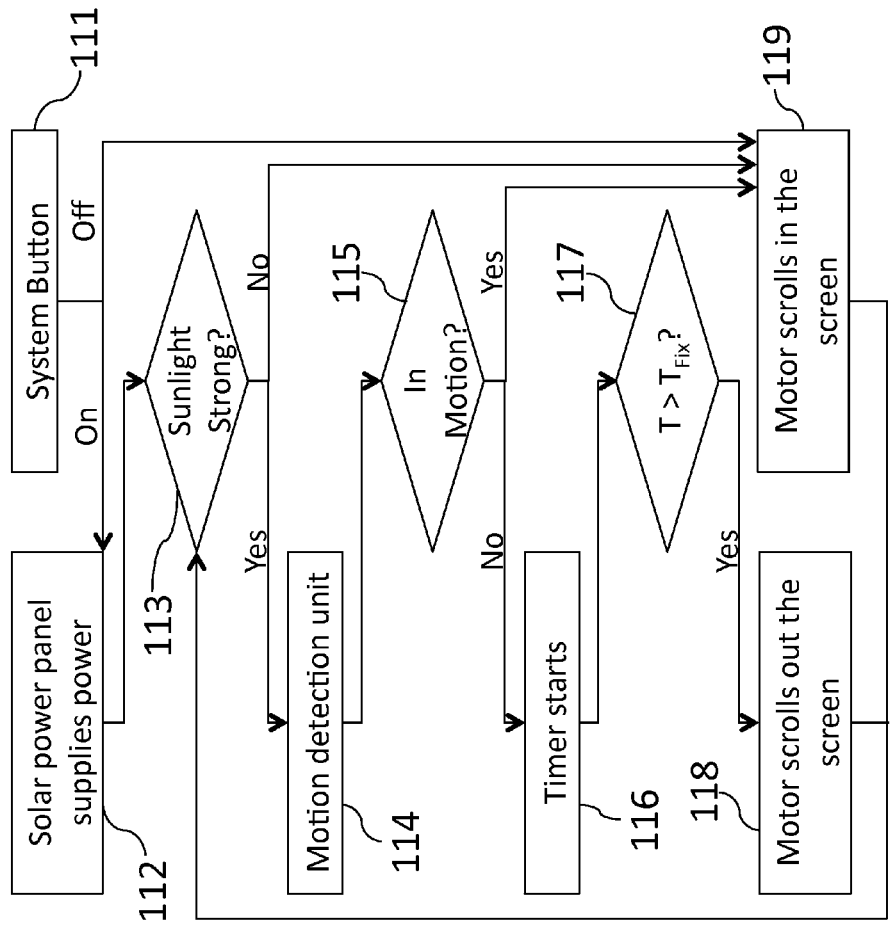
FIG. 11 is a simplified flowchart of operation of the automated sunshade shown in FIG. 10, in accordance with an embodiment.

FIG. 11 is a simplified flowchart of operation of automated sunshade 100 shown in FIG. 10. Block 111 represents a state of power switch 106. When power switch 106 is in the on position, block 112 represents solar panel 101 supplying power to the motor of automated sunshade 100. Block 113 represents sunshade system 100 detecting relative strength of the sunlight. When in block 113 sunshade system 100 detects strong sunlight, i.e., detected strength of sunlight is greater than a predetermined threshold, block 114 represents operation of a motion detection unit detecting motion. In a block 115, if the motion detection unit does not detect motion, in a block 116 a timer starts. When in block 117 a timer value (T) reaches a predetermined value ($T_{Fix}$), then in a block 118, the motor within sunshade system 100 is activated to scroll out the shield material.

In block 113, instead of detecting sunlight, interior temperature of the car can be measured by a temperature detector to determine whether the interior temperature is above a predetermined threshold before sunshade system 100 is activated to scroll out the shield material.

After the shield material of sunshade system 100 is scrolled out, FIG. 13 shows conditions in which the shield material is rolled up into a closed position. When in block 111 the power switch 106 is turned to an off position, in a block 119 the motor of sunshade system 100 rolls up the shield material into a closed position. When in block 113 sunshade system 100 detects sunlight is no longer strong, i.e., is less than a predetermined threshold, in block 119 the motor of sunshade system 100 rolls up the shield material into a closed position. In a block 115, if the motion detection unit detects motion, in block 119, the motor of sunshade system 100 rolls up the shield material into a closed position.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An automated vehicle sunshade system comprising:
   a roller;
   shield material mounted on the roller;
   a motor that opens the shield material so as to block sunlight entering a vehicle through a window;
   a solar panel that provides power to the motor; and,
   circuitry, including a motion detector, that allows the motor to open the shield material only when the motion detector does not detect motion for a predetermined amount of time, the circuitry causing the shield material to retract when the motion detector detects motion.

2. An automated vehicle sunshade system as in claim 1 additionally comprising:
   tracks that guides the shield material as the motor opens the shield material.

3. An automated vehicle sunshade system as in claim 1 wherein the motor opens the shield material by pulling on a chord attached to the shield material.

4. An automated vehicle sunshade system as in claim 1 wherein the shield material opens by extending in a horizontal direction across the window.

5. An automated vehicle sunshade system as in claim 1 wherein the shield material opens by extending in a vertical direction across the window.

6. An automated vehicle sunshade system as in claim 1 wherein the window is a windshield of the vehicle.

7. An automated vehicle sunshade system as in claim 1 wherein the window is a rear window of the vehicle.

8. An automated vehicle sunshade system as in claim 1 wherein the window is a side window of the vehicle.

9. An automated vehicle sunshade system as in claim 1 wherein the circuitry causes the shield material to retract when light captured by the solar panel is below a predetermined intensity threshold.

10. An automated vehicle sunshade system as in claim 1 wherein the circuitry causes the shield material to open when light captured by the solar panel is above a predetermined intensity threshold.

11. An automated vehicle shade as in claim 1 additionally comprising an open/retract switch that a user can use to open and retract the shield material.

12. An automated vehicle shade as in claim 1 wherein the motor is mounted on an opposite side of the window than the roller.

13. An automated vehicle sunshade system as in claim 1 additionally comprising:
- a base that mounts the automated vehicle sunshade system to the vehicle, comprising at least one of the following:
  - strips of a hook and loop fastener;
  - suction cups;
  - static electricity film.

14. An automated vehicle sunshade system as in claim 1 additionally comprising at least one of the following:
- static electricity film that guides the shield material as the motor opens the shield material;
- a fixed pulley that guides the shield material as the motor opens the shield material.

15. An automated vehicle sunshade system as in claim 1 wherein the motor opens the shield material using a chain attached to the shield material.

16. An automated vehicle sunshade system as in claim 1 wherein the circuitry causes the shield material to open when temperature within the vehicle is above a predetermined threshold.

17. An automated vehicle sunshade system comprising:
- a roller;
- shield material mounted on the roller;
- a motor that opens the shield material so as to block sunlight entering a vehicle through a window;
- a power source that provides power to the motor;
- an open/retract switch which a user can use to open and retract the shield material; and,
- circuitry, including a motion detector, that allows the motor to open the shield material only when the motion detector does not detect motion, the circuitry causing the shield material to retract when the motion detector detects motion.

18. An automated vehicle sunshade system as in claim 17 wherein the power source includes a battery.

19. An automated vehicle sunshade system as in claim 17 wherein the power source includes a solar panel.

20. An automated vehicle sunshade system as in claim 17 wherein the power source includes a solar panel and a rechargeable battery.

21. An automated method for providing shade in a vehicle, comprising:
- mounting shield material on a roller;
- causing the shield material to open so as to block sunlight entering a vehicle through a window when light captured by a solar panel is above a predetermined intensity threshold, electricity from the solar panel powering a motor that opens the shield material;
- causing the shield material to retract when light captured by the solar panel is below a predetermined intensity threshold; and,
- preventing the shield material from opening when a motion detector detects vehicle motion or when vehicle interior temperature is below a predetermined threshold.

22. An automated method as in claim 21 additionally comprising:
- retracting the shield material when the shield material is open and the motion detector detects vehicle motion.

\* \* \* \* \*